US008833796B2

(12) United States Patent
LaVere et al.

(10) Patent No.: US 8,833,796 B2
(45) Date of Patent: Sep. 16, 2014

(54) AIR BAG MOUNTING ASSEMBLY AND METHODS

(71) Applicants: Michael J. LaVere, Hagerstown, IN (US); Bruce A. Crume, Portage, MI (US); Steven R. Siler, Charlotte, MI (US)

(72) Inventors: Michael J. LaVere, Hagerstown, IN (US); Bruce A. Crume, Portage, MI (US); Steven R. Siler, Charlotte, MI (US)

(73) Assignee: Spartan Motors, Inc., Charlotte, MI (US)

( * ) Notice: Subject to any disclaimer, the term of this patent is extended or adjusted under 35 U.S.C. 154(b) by 0 days.

(21) Appl. No.: 13/967,542

(22) Filed: Aug. 15, 2013

(65) Prior Publication Data

US 2014/0049027 A1 Feb. 20, 2014

Related U.S. Application Data

(60) Provisional application No. 61/683,684, filed on Aug. 15, 2012, provisional application No. 61/683,701, filed on Aug. 15, 2012.

(51) Int. Cl.
*B60R 21/206* (2011.01)
*B60R 21/045* (2006.01)
*B60R 21/231* (2011.01)
*B60R 21/20* (2011.01)
*B60R 21/00* (2006.01)

(52) U.S. Cl.
CPC ....... *B60R 21/206* (2013.01); *B60R 2021/0074* (2013.01); *B60R 21/231* (2013.01); *B60R 21/20* (2013.01); *B60R 2021/0051* (2013.01); *B60R 21/045* (2013.01)
USPC ........................... 280/728.2; 280/752; 296/70

(58) Field of Classification Search
CPC .. B60R 21/206; B60R 21/205; B60R 21/045; B60R 2021/024; B60R 2021/0051; B60K 37/00
USPC .............. 280/732, 728.2, 730.1, 752; 180/90; 296/70, 72
See application file for complete search history.

(56) References Cited

U.S. PATENT DOCUMENTS

| | | | | |
|---|---|---|---|---|
| 3,897,848 A * | 8/1975 | Arnstson et al. | ................ | 180/90 |
| 4,032,175 A * | 6/1977 | Aibe et al. | .................... | 280/751 |
| 4,065,157 A * | 12/1977 | Abe et al. | ...................... | 280/751 |
| 5,230,530 A | 7/1993 | Iriyama et al. | | |
| 5,311,960 A * | 5/1994 | Kukainis et al. | ................ | 180/90 |
| 5,516,145 A | 5/1996 | Williams et al. | | |
| 5,927,755 A * | 7/1999 | Matsuo et al. | ................ | 280/752 |
| 6,145,880 A * | 11/2000 | White et al. | .................. | 280/752 |
| 6,786,508 B2 * | 9/2004 | Fraley et al. | .................. | 280/751 |
| 7,938,441 B2 * | 5/2011 | Fukawatase et al. | ......... | 280/731 |
| 8,444,177 B2 * | 5/2013 | Wallat et al. | ............... | 280/730.2 |
| 2004/0075253 A1 | 4/2004 | Morita | | |
| 2008/0100042 A1 | 5/2008 | Adachi et al. | | |
| 2010/0013200 A1 | 1/2010 | Fukawatase et al. | | |

* cited by examiner

*Primary Examiner* — Drew Brown
(74) *Attorney, Agent, or Firm* — Reinhart Boerner Van Deuren P.C.

(57) ABSTRACT

A knee air bag mounting system is provided that includes an air bag mount for a heavy truck-type vehicle. Such an air bag mount includes a front wall having an air bag aperture therein adapted for passage of an air bag module of the knee air bag system. The air bag mount also includes a first side wall extending away from the front wall, a second side wall extending away from the front wall in opposed-spaced relation to the first side wall, a top wall extending away from the front wall, and a bottom wall extending away from the front wall. A bracket structure is disposed within an interior space of the air bag mount and configured to provide a connection point for the air bag module. Each of the first and second side walls and top and bottom walls are free from direct connection to one another.

15 Claims, 10 Drawing Sheets

AIR BAG MOUNTING ASSEMBLY AND METHODS

CROSS-REFERENCE TO RELATED PATENT APPLICATIONS

This patent application claims the benefit of U.S. Provisional Patent Application Nos. 61/683,684, filed Aug. 15, 2012, and 61/683,701, filed Aug. 15, 2012, the entire teachings and disclosures of which are incorporated herein by reference thereto.

FIELD OF THE INVENTION

This invention generally relates to air bag systems, and more particularly to mounts for air bag systems.

BACKGROUND OF THE INVENTION

There is an ongoing need for safer vehicles in the automotive context. In this regard various developments have been made in air bag technology. As a result, many contemporary vehicle designs incorporate a variety of air bag systems at various locations within the vehicle.

One common location of air bag placement is on the driver side, facing the area where the driver's knees will be situated. In cars and light trucks, a generally horizontal steering column is typically situated therein. As a result, the knee air bag system may be conveniently located beneath the steering column. In such a design, the knee air bag system including the air bag itself, the propulsion system, and its mounting bracket, typically extends the length of the driver side compartment. As a result, a single air bag may be utilized that, when deployed, will protect both of the driver's knees.

Unfortunately, heavy truck type vehicles, e.g. class 8 trucks, buses, heavy equipment such as cranes, large cargo vehicles, large recreational vehicles, etc. typically incorporate a generally vertical steering column. As a result, a single knee air bag system such as the like described above cannot be utilized, as the steering column due to its generally vertical presentation interferes with the space required for such a single air bag system. As a result, the aforementioned heavy truck type vehicles typically do not incorporate any knee air bag system, or if they do, their mounting is quite complex and rigid and has led to knee injury. Indeed, even after air bag deployment in such systems, it has been found that there is a risk that continued forward movement of the knees can result in knee injury when the knees encounter the air bag mounting structure.

Accordingly, there is a need in the art for a knee air bag mounting configuration that prevents such injury by absorbing some of the force caused by forward movement of the driver's knees against the air bag through deformation of the air bag mounting configuration.

The invention provides such a mounting configuration. These and other advantages of the invention, as well as additional inventive features, will be apparent from the description of the invention provided herein.

BRIEF SUMMARY OF THE INVENTION

In one aspect, embodiments of the invention provide an air bag mount for a knee air bag system of a heavy truck-type vehicle. Such an air bag mount includes a front wall having an air bag aperture therein adapted for passage of an air bag module of the knee air bag system. The air bag mount also includes a first side wall extending away from the front wall, a second side wall extending away from the front wall in opposed-spaced relation to the first side wall, a top wall extending away from the front wall, and a bottom wall extending away from the front wall. A bracket structure is disposed within an interior space of the air bag mount and configured to provide a connection point for the air bag module. Each of the first and second side walls and top and bottom walls are free from direct connection to one another.

The first and second sidewalls and top and bottom walls define a body structure of the air bag mount. The body structure is formed as a unitary body from sheet metal. The body structure has a thickness of about 0.01 inches to about 0.1 inches.

Each of the front wall, top wall, and bottom wall include a plurality of mounting points for mounting the air bag mount. The top wall has a stepped-shape with an upper portion, a lower portion, and an intermediary portion positioned between the upper and lower portions. The plurality of mounting points of the top wall comprises a plurality of apertures formed through the lower portion of the top wall. The bottom wall extends away from the front wall at an angle of greater than 90° to a peripheral edge. The plurality of mounting points of the bottom wall comprises a plurality of apertures formed proximate the peripheral edge of the bottom wall. The plurality of mounting points of the front wall comprises a plurality of mounting apertures positioned above the air bag aperture.

In another aspect, embodiments of the invention provide an air bag mount for a knee air bag system of a heavy truck-type vehicle. Such an air bag mount includes a front wall, a first side wall extending away from the front wall, and a second side wall extending away from the front wall in opposed-spaced relation to the first side wall. The air bag mount also includes a top wall extending away from the front wall to a rear-most peripheral edge. A bottom wall extends away from the front wall in opposed-spaced relation to the top wall. A bracket structure is disposed within an interior space of the air bag mount. The air bag mount has a first undeformed configuration and a second deformed configuration. In the undeformed configuration, the rear-most peripheral edge of the top wall is at a first distance relative to the front wall. In the deformed configuration, the rear-most peripheral edge of the top wall is at a second distance relative to the front wall that is less than the first distance.

The bottom wall is only connected to the first and second side walls via the front wall such that the bottom wall is movable relative to each of the first and second side walls and the front wall. The bottom wall forms a first angle with the front wall in the undeformed configuration, and a second angle with the front wall in the deformed configuration that is greater than the first angle.

The first side wall includes a collapse clearance feature configured to permit movement of an edge of a mounting structure to which the air bag mount is mounted to beyond a rear-most peripheral edge of the first side wall. The rear-most peripheral edge of the first side wall is positioned at a third distance from the front wall in the deformed condition. The edge of the mounting structure is positioned at a fourth distance from the front wall in the deformed condition. The fourth distance is less than the third distance. In certain embodiments, the collapse clearance feature is a rectangular cut-out of an upper corner of the first side wall.

The second side wall extends to a rear-most peripheral edge that is positioned at a fifth distance relative to the front wall in the deformed configuration. The fifth distance is less than the third distance.

In another aspect, embodiments of the invention provide a knee air bag mounting system for a driver-side cab space of a heavy vehicle, the cab space including a body structure, a dash assembly mounted to the body structure, and a steering column, knee air bag mounting system includes a left mount configured to receive an air bag module and a right mount configured to receive an air bag module. The left and right mounts are arranged such that the steering column is interposed therebetween. Each of the left and right mounts are mounted at two distinct locations to the body structure, and at one location to the dash assembly.

The left mount and right mount are free from direct connection to one another. Each of the left and right mounts includes a body structure that defines an interior space, and each of the left and right mounts includes a bracket structure contained within the interior space. The bracket structure is configured for connection to the respective air bag module received by each of the left and right mounts. The body structure and bracket structure are sheet metal bodies. The body structure and bracket structure have a thickness of about 0.01 inches to about 0.1 inches.

The body structure includes a front wall, first and second side walls in opposed-spaced relation which extend away from the front wall, and top and bottom walls in opposed-spaced relation which extend away from the front wall. None of the first and second side walls and top and bottom walls are directly connected to one another.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
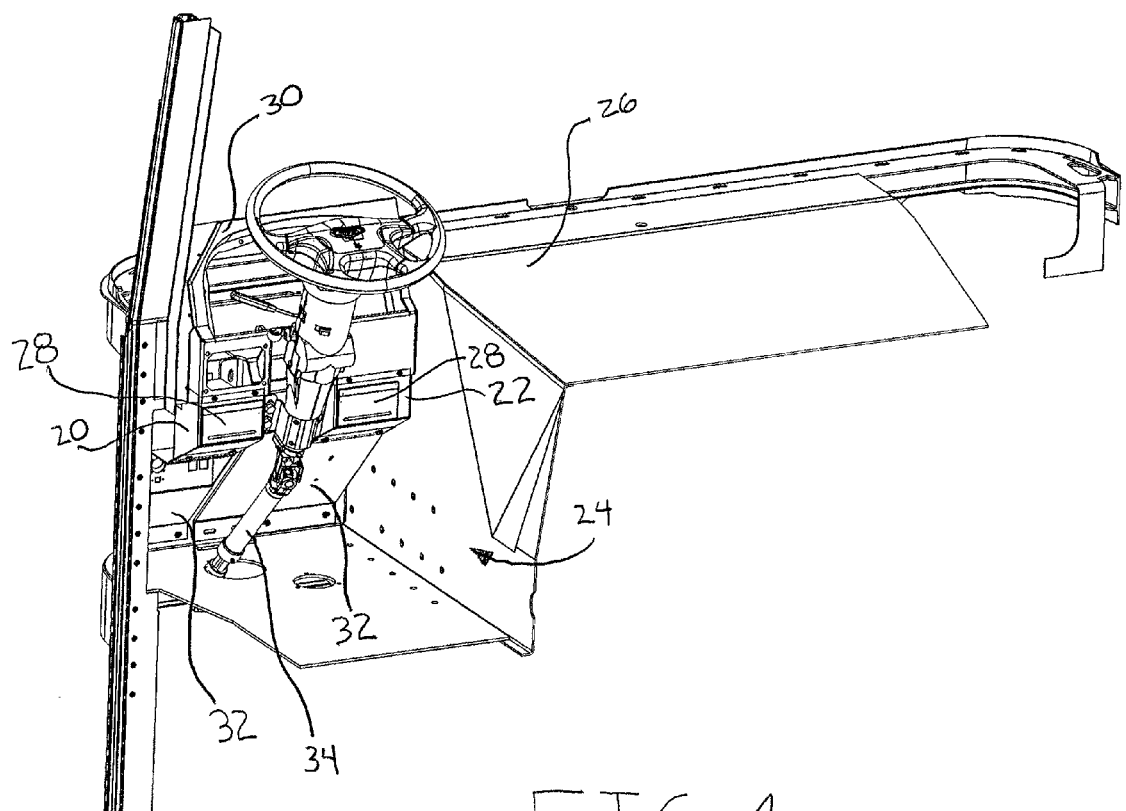
FIG. 1 is a partial perspective view of embodiments of air bag mounts according to the teachings of the present invention.

Turning now to the drawings, FIG. 1 illustrates one embodiment of an air bag system which incorporates a left knee air bag mount 20 and a right knee air bag mount 22 according to the teachings of the present invention. Left knee air bag mount 20 is referred to herein below as left mount 20, while right knee air bag mount 22 is referred to herein below as right mount 22. As will explained in greater detail below, each of left and right mounts 20, 22 advantageously allow for energy absorption during impact to reduce or eliminate the risk of knee injury once the air bag module 28 of each of left and right mounts 20, 22 has deployed and there is continued forward movement of a driver's knees. In other words, as the driver's knees bias the deployed air bag forward during an impact event, left and right mounts 20, 22 will partially deform rather than maintain their rigid positioning so as to avoid the driver's knees from encountering left and right mounts 20, 22.

Each of left and right mounts 20, 22 are positioned within a driver's side cab space 24 as generally shown in FIG. 1. This cab space 24 is defined by a body structure 26. It will be understood from the following that the advantages of the left and right mounts 20, 22 are not in any way limited to the specific body structure 26 shown in FIG. 1. Indeed, body structure 26 may take on a variety of forms indicative of a heavy truck-type vehicle, examples of which are provided above.

Each of left and right mounts 20, 22 are positioned below a dash assembly 30. An upper edge of each of left and right mounts 20, 22 is mounted to dash assembly 30 as shown. Further, a lower edge of each of left and right mounts 20, 22 is mounted to electrical close outs 32 of body structure 26 commonly used to shield a driver from electrical wiring of the heavy truck-type vehicle. A generally vertical steering column 34 extends upwardly from a floor of body structure 26. Steering column 34 extends between left and right mounts 20, 22 as shown.

Figure 2:
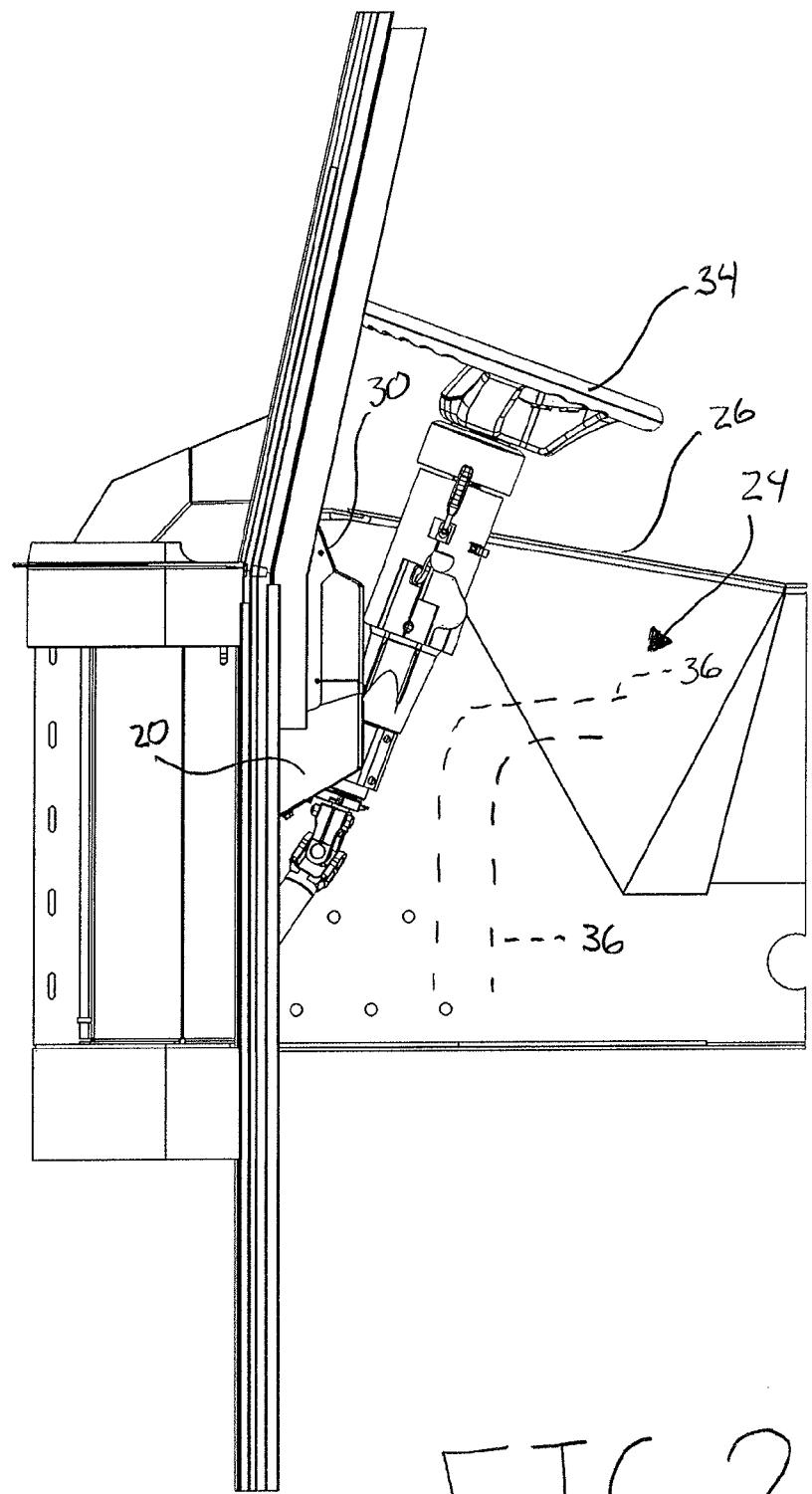
FIG. 2 is a partial side view of the embodiments of FIG. 1.

Turning now to FIG. 2, a driver's knees are typically located in the region bounded by dashed lines 36. As can be seen from inspection of FIG. 2, the driver's knees are thus located in proximity to air bag module 28 (See FIG. 1) carried by left and right mounts 20, 22, respectively. Deployment of the air bag carried by air bag module 28 during a crash event initially protects the driver's knees as they move forward towards each of left and right mounts 20, 22. Continued pressure against this inflated air bag by the driver's knees will thereafter cause a material deformation each of left and right mounts 20, 22 to thereby absorb the impact energy of the air bag against the mount. As stated above, this functionality also advantageously reduces or eliminates the risk that the driver's knees will continue to move forward until they engage some portion of the left and right mounts 20, 22 which has been found to cause knee injuries as stated above.

Figure 3:
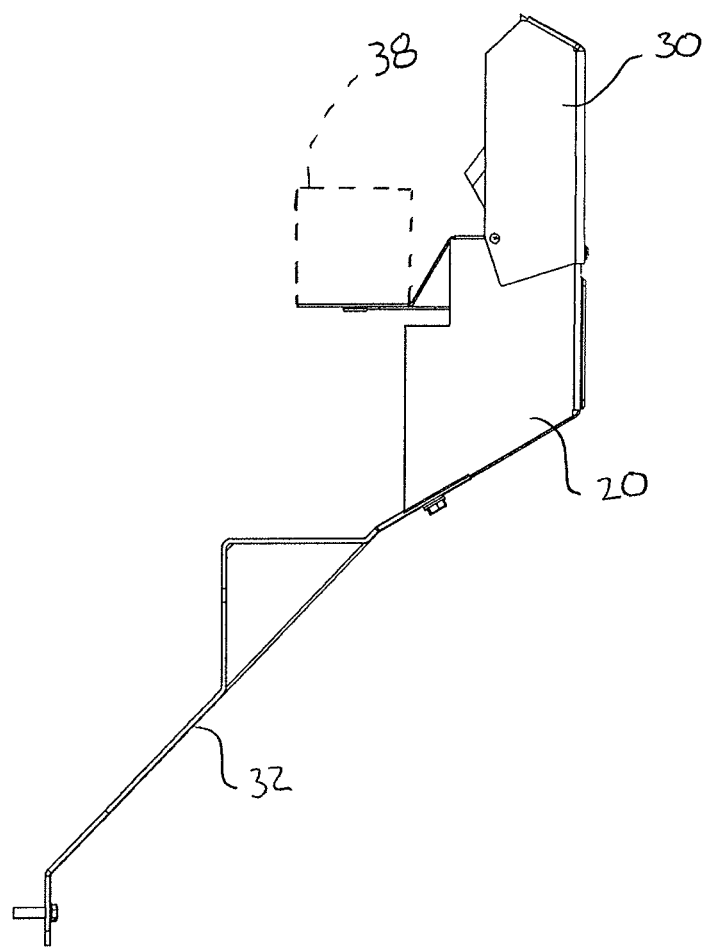
FIG. 3 is another partial side view of the embodiments of FIG. 1.

Turning now to FIG. 3, a side view of left mount 20 is shown in its mounted configuration. Portions of dash assembly 30 and body structure 26 are removed in this view for purposes of clarity. As can be seen in this view, an upper edge or portion of left mount 20 is mounted to dash assembly 30. A lower portion of left mount 20 is mounted to electrical close out 32. Additionally, another generally upper portion of left mount 20 is mounted to a cross bar 38 of body structure 26. Accordingly, left mount 20 has 3 separate mounting locations.

Figure 4:
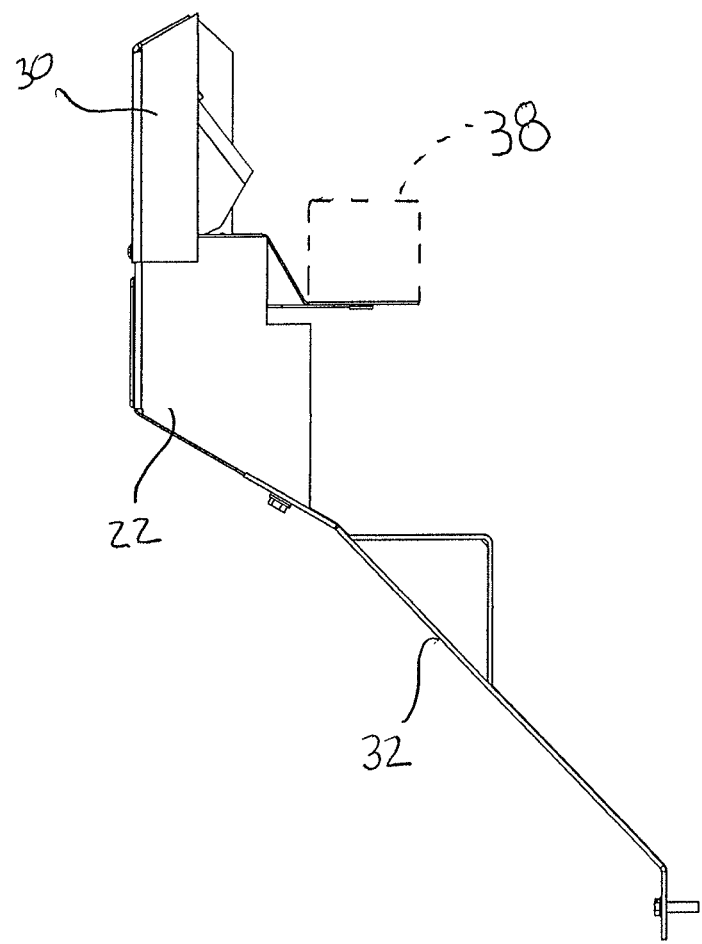
FIG. 4 is a another partial side view of the embodiments of FIG. 1, illustrating the side opposite that shown in FIG. 3.

Turning now to FIG. 4, right mount 22 is also shown in its mounted configuration. As was the case with FIG. 3, portions of dash assembly 30 and body structure 26 are removed for purposes of clarity. Right mount 22 is mounted at an upper portion thereof to dash assembly 30. Right mount 22 is mounted at a lower portion thereof to electrical close out 32. An additional generally upper portion of right mount 22 is mounted to cross bar 38 of body structure 26. As a result, and in the same manner as left mount 20, right mount 22 is mounted at three separate locations. It should be noted that crossbar 38 extends laterally beyond outer peripheral sidewalls of each of left and right mounts 20, 22. As a result, continued rearward movement of left and right mounts 20, 22 during an impact event can result in interference between left and right mounts 20, 22 and crossbar 38, given that crossbar 38 is generally rigidly within body structure 26. As will be explained in greater detail below, left and right mounts 20, 22 each incorporate a collapse clearance feature which accommodates the relatively fixed position of crossbar 38.

Figure 5:
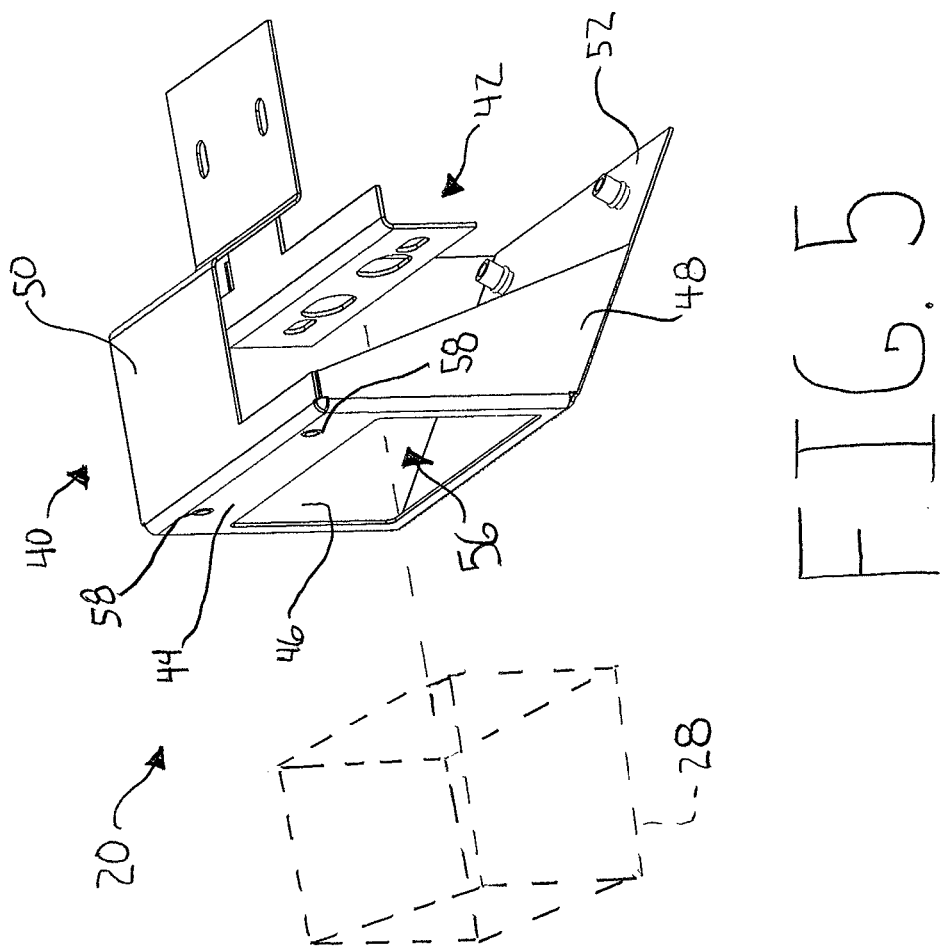
FIG. 5 is a perspective exploded view of one of the air bag mounts of FIG. 1 in the context of a schematic air bag module.

Turning now to FIG. 5, the specific structural attributes of left mount 20 will be described in greater detail. As shown in FIG. 5, air bag module 28 is schematically represented and exploded away from left mount 20. Left mount 20 includes a body structure 40 as well as a generally internal bracket structure 42 mounted to body structure 40. Body structure 40 includes a front wall 44, first and second opposed side walls 46, 48 which extend rearwardly from front wall 44, and top and bottom walls which are in opposed-spaced relation to one another and extend rearwardly away from front wall 44. Front wall 44 includes an air bag module aperture 56 for receipt of air bag module 28. Additionally, front wall 44 includes apertures 58 which may also include threaded inserts therein for purposes of mounting the upper portion of left mount 20 to dash assembly 30.

Figure 6:
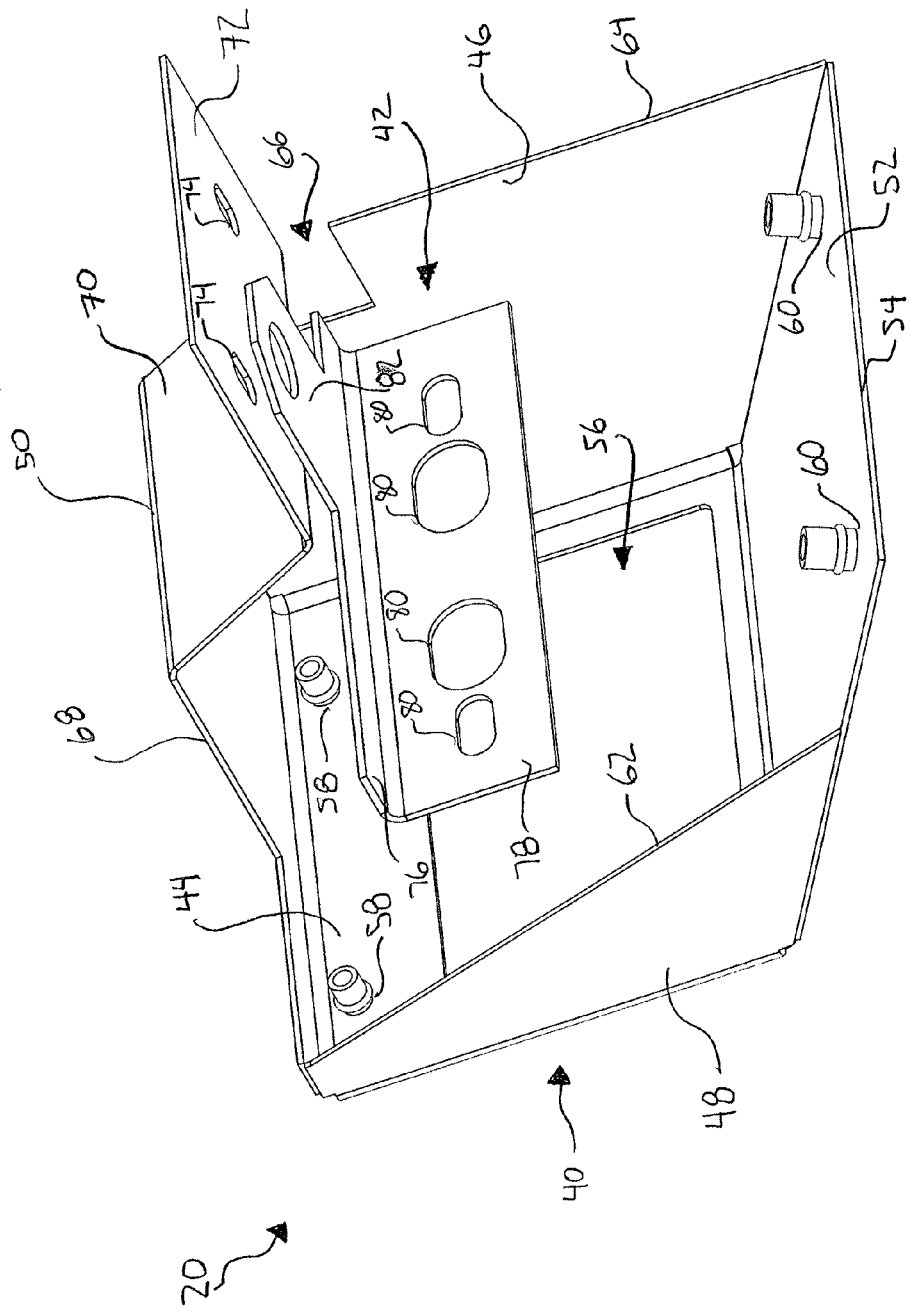
FIG. 6 is a perspective view of the air bag mount of FIG. 5.

With reference now to FIG. 6, bottom wall 52 extends at an angle generally greater than 90° away from front wall 44 as shown. Mounting apertures 56 which may include threaded inserts therein are formed in bottom wall 52 for mounting bottom wall 52 to electrical close out 32 as described above. Bottom wall 52 extends rearwardly to a rear-most peripheral edge 54 as shown. Second side wall 48 extends to a rear-most peripheral edge 62 which is closer to front wall 44 than peripheral edge 54 of bottom wall 52. First side wall 46 extends to a rear-most peripheral edge 64 which is generally at the same distance from front wall 44 as peripheral edge 54 of bottom wall 52.

Additionally, first side wall 46 includes a collapse clearance feature 66 formed therein. In the particular embodiment shown, this feature is generally a notch or cut out at a corner of first sidewall 46. With momentary reference back to FIG. 3, cross bar 38 will generally remain in a fixed position during an impact event. However, portions of left mount 20 including first side wall 46 will move from right to left relative to FIG. 3. Collapse clearance feature 66 thus provides for continued movement of first side wall 46 despite cross bar 38 maintaining its fixed position. It has been found that the width of collapse clearance feature 66 shown in FIG. 3 is sufficient to accommodate right to left movement of left mount 20 despite the fixed position of cross bar 38 under a variety of anticipated loading conditions. Put differently, an edge of crossbar 38 closest to front wall 44 will be positioned within collapse clearance feature 66 such that this edge is closer to front wall 44 than peripheral edge 64 of first sidewall 46 is to front wall 44.

Returning back to FIG. 6, top wall 50 includes an upper portion 68, an intermediary portion 70, and a lower portion 72. As can be seen in this view, intermediary portion 70 is generally disposed at an angle of greater than 90° relative to upper and lower portions 68, 72. A plurality of mounting apertures or slots 74 are formed in lower portion 72 for mounting upper wall 50 to cross bar 38 (See FIG. 3). As can also be seen in this view, upper wall 50 is not as wide as front wall 44. This reduced width aids in the deformation of upper wall 50 under an impact event to allow for rearward movement of left mount 20, i.e. generally from left to right in FIG. 6.

Bracket structure 42 is mounted to upper wall 50. More specifically, bracket structure 42 is generally L-shaped having an upper portion 76 and a lower portion 78. A plurality of mounting apertures 80 are formed in lower portion 78 for mounting air bag module 28 (See FIG. 5) thereto. A mounting tab 82 extends away from upper portion 76 and is rigidly affixed to an under side of lower portion 72 of upper wall 50. This connection of mounting tab 82 to upper wall 50 may be achieved via welding, brazing, adhesives, and/or mounting hardware such as bolts, screws, and/or rivets, etc.

Still referring to FIG. 6, each of first and second side walls 46, 48 and top and bottom walls 50, 52 are connected to front wall 44. However, none of first and second side walls 46, 48 or top and bottom walls 50, 52 are connected to one another. For example, bottom wall 52 and first side wall 46 are not connected to one another in the corner area present therebetween. The same is true for first side wall 46 and top wall 50. Likewise, second side wall 48 and bottom wall 52 are not connected to one another in the corner area formed therebetween. The same is true for second side wall 48 and top wall 50.

To achieve such a configuration body structure 4 may begin as a generally cross-shaped stamped part with each of first and second side wall 46, 48 and top and bottom walls 50, 52 independently folded rearwardly relative to front wall 44. Such a configuration advantageously allows for independent relative movement of first and second side walls 46, 48 and top and bottom walls 50, 52 relative to front wall 44. This allows for enhanced deformation characteristics and load absorption during impact. Such load absorption and energy dissipation characteristics would not be achieved if the aforementioned walls were connected to one another, i.e. if body structure 40 was formed by a process such as deep drawing.

Figure 7:
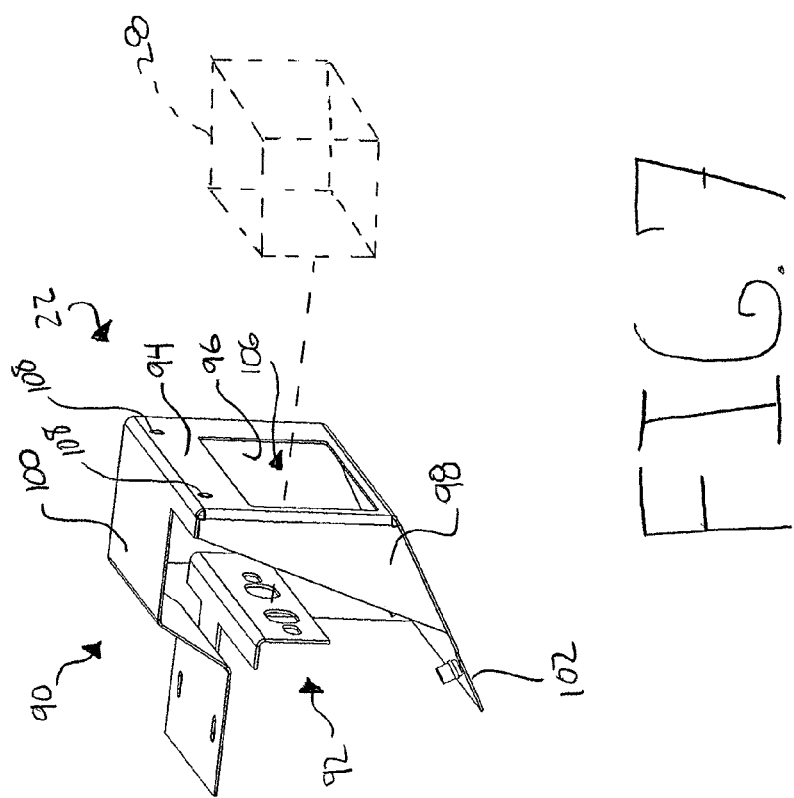
FIG. 7 is a perspective exploded view of the other one of the air bag mounts of FIG. 1 in the context of a schematic air bag module.

Turning now to FIG. 7, right mount 22 will be described in greater detail. Right mount 22 is generally the same shape as left mount 20, except that the particular embodiment of right mount 22 illustrated is somewhat wider than left mount 20. Right mount 22 also incorporates a body structure 90 and a generally internal mounting structure 92. Body structure 90 includes a front wall 94, first and second opposed side walls 96, 98, and top and bottom opposed walls 100, 102. Front wall 94 includes an air bag module aperture 106 for receipt of air bag module 28 which is schematically shown in FIG. 7. Front wall 94 also includes mounting apertures 108 which may include threaded inserts for mounting right mount 22 to dash assembly 30 as shown in FIG. 1.

Figure 8:
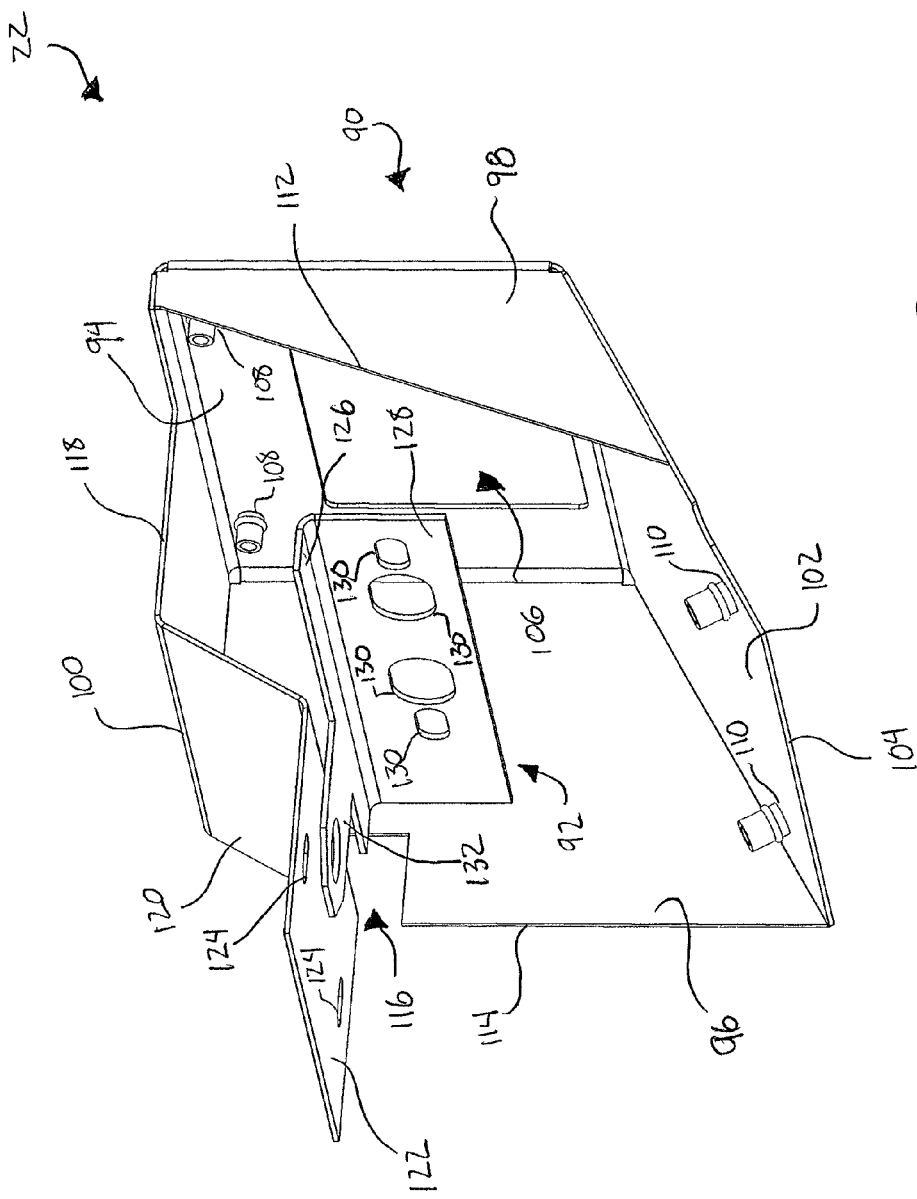
FIG. 8 is a perspective view of the air bag mount of FIG. 7.

Turning now to FIG. 8, bottom wall 102 extends angularly away from front wall 94 to a peripheral edge 104. A plurality of mounting apertures 110 which may include threaded inserts are formed through bottom wall 102 for connecting it to electrical close out 32 as shown in FIG. 4.

Second side wall 98 extends rearwardly away from front wall 94 to a peripheral edge 112. Edge 112 of second side wall 98 is closer to front wall 94 than edge 104 of bottom wall 102. First side wall 96 extends rearwardly away from front wall 94 to a peripheral edge 114. Peripheral edge 114 is generally situated at the same distance from front all 94 as peripheral edge 104 of bottom wall 102.

First side wall 96 also incorporates a collapse clearance feature 116. With momentary reference to FIG. 4, collapse clearance feature 116 allows for continued movement of right mount 22 from left to right in FIG. 4 during an impact event despite cross bar 38 maintaining its generally fixed position. Collapse clearance feature 116 thus provides for continued movement of first side wall 96 despite cross bar 38 maintaining its fixed position. It has been found that the width of collapse clearance feature 116 shown in FIG. 4 is sufficient to accommodate left to right movement of right mount 22 despite the fixed position of cross bar 38 under a variety of anticipated loading conditions. Put differently, an edge of crossbar 38 closest to front wall 94 will be positioned within collapse clearance feature 96 such that this edge is closer to front wall 94 than peripheral edge 114 of first sidewall 96 is to front wall 94. Returning now to FIG. 8, top wall 100 includes an upper portion 118, an intermediary portion 120, and a lower portion 122. Intermediary portion 120 forms an angle of greater than 90° relative to each of upper and lower portions 118, 122. A plurality of mounting apertures or slot 124 are formed in lower portion 122 for mounting top wall 100 to cross bar 38 as shown in FIG. 4.

Bracket structure 92 is generally L-shaped having an upper portion 126, and a lower portion 128. A plurality of mounting apertures 130 are formed in lower portion 128. A mounting tab 132 extends rearwardly away from upper portion 126 and is used for mounting bracket structure 92 to an under side of lower portion 122 of top wall 100. The rigid connection of bracket structure 92 to top wall 100 may be achieved by welding, brazing, adhesives, and/or mounting hardware such as screws, bolts, and/or rivets, etc.

As was the case with left mount 20 described above, first and second side walls 96, 98 and top and bottom walls 100, 102 are not connected to one another. For example, the right-most edge of lower wall 102 shown in FIG. 8 is not connected to the bottom-most edge of second side wall 98. The same holds true for the left-most edge of bottom wall 102 shown in FIG. 8 and the lower-most edge of first side wall 96. Additionally, the upper-most edges of first and second side walls 96, 98 are not connected to top wall 100. Rather, each of the aforementioned walls are only connected to front wall 94. As a result, each of the aforementioned walls may move independently of one another relative to front wall 94.

To achieve such a configuration, body structure 90 may be formed as a generally cross-shaped stamped part with each of first and second side walls 96, 98 and top and bottom walls 100, 102 folded rearwardly away from front wall 94. The foregoing advantages of independent movement of right mount 22 would not be possible if the aforementioned walls were connected to one another, for example if right mount 22 was formed by deep drawing.

Figure 9:
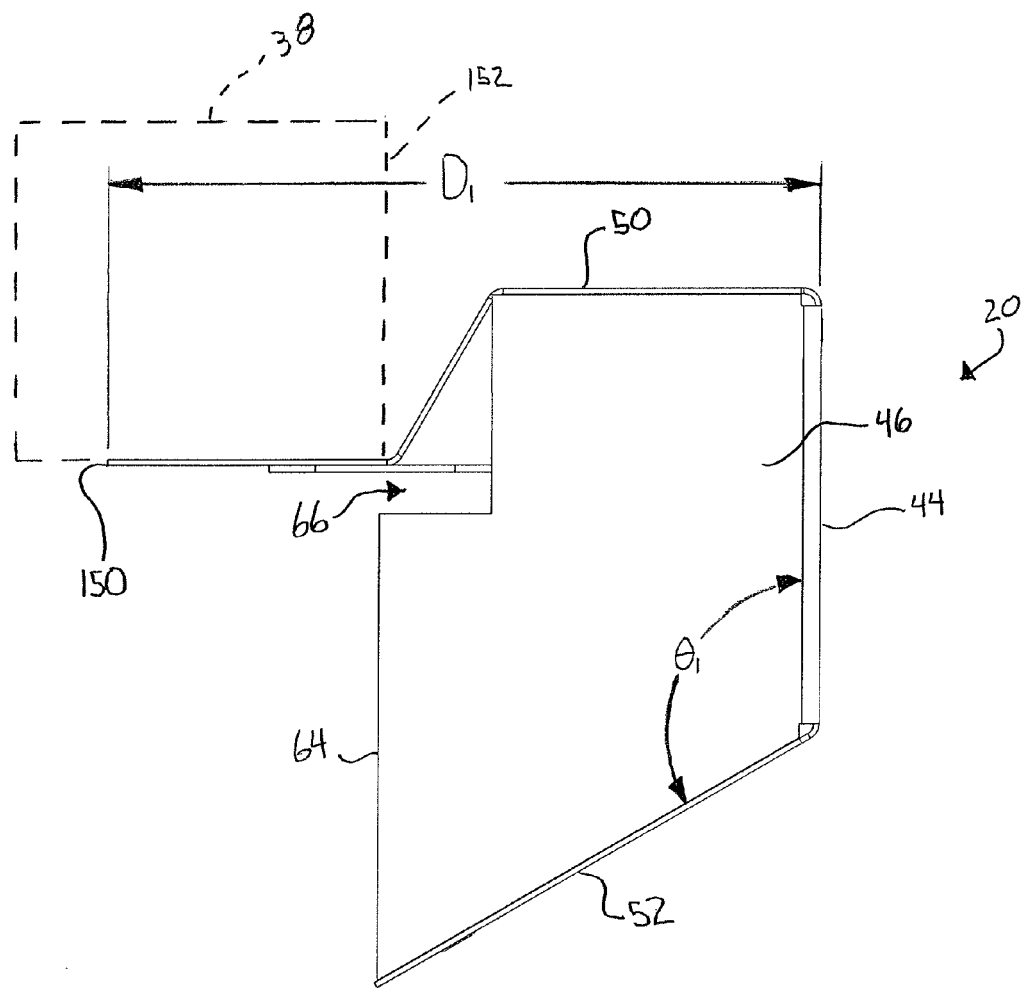
FIG. 9 shows an exemplary representation of an undeformed configuration of the mounts of FIG. 1.
Figure 10:
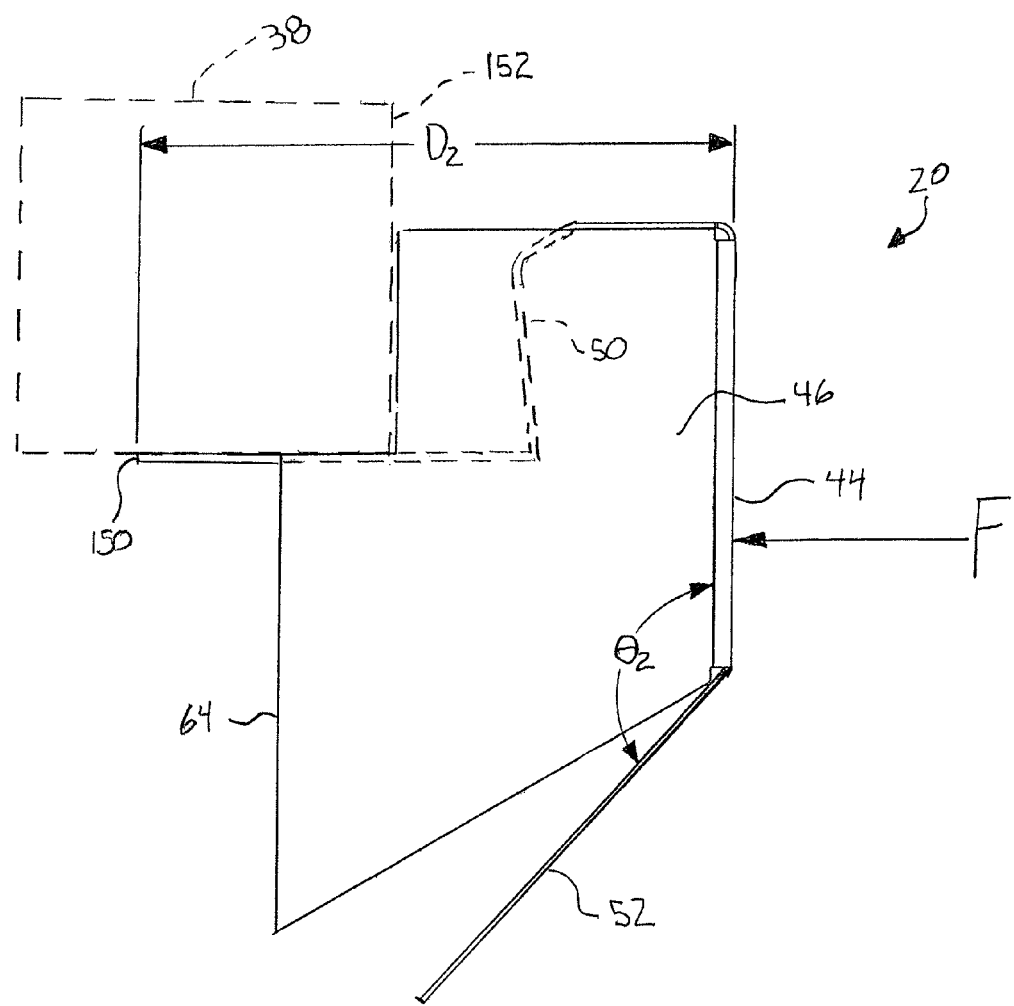
FIG. 10 shows an exemplary representation of a deformed configuration of the mounts of FIG. 1.

Turning now to FIGS. 9 and 10, the same show respectively an undeformed configuration (i.e. the configuration of left mount 20 prior to an impact event) and a deformed configuration of left mount 20 (i.e. the configuration of left mount 20 after an impact event). The configurations of left mount 20 shown in FIGS. 9 and 10 are also representative of the undeformed and deformed configurations of right mount 22, and as such, only left mount 20 is shown for purposes of brevity. Additionally, the deformed configuration explained below should be taken by way of example in that other deformations of various portions of left and right mounts 20, 22 are expected. FIGS. 9 and 10 illustrate two particular deformations that have been found to repeatedly occur when a horizontal load F (see FIG. 10) is applied to front wall 44. This horizontal load F is indicative of the force applied to front wall 44 as a driver's knee biases an inflated air bag against front wall 44.

With reference to FIG. 9, in the undeformed configuration, a rear-most peripheral edge 150 of top wall 50 is situated at a distance $D_1$ from front wall 44. Also, bottom wall 50 is oriented at an angle $\theta_1$ relative to front wall 44. With reference to FIG. 10, upon application of load F which is sufficient to deform left mount 20 into a deformed configuration, edge 150 will thereafter be located at distance $D_2$ from front wall 44 which is less than $D_1$. Additionally, bottom wall 52 will be oriented at an angle $\theta_2$ relative to front wall 44 which is greater than angle $\theta_1$. As discussed above, the fact that both top and bottom walls 50, 52 are not directly connected to sidewalls 46, 48 allow for the deformations shown. These deformations function to absorb energy and reduce or eliminate the risk that the drivers knee will encounter mounts 20, 22.

Also as shown in FIG. 10, cross bar 38 is positioned within collapse clearance feature 66 in the deformed configuration. More specifically, an edge 152 of crossbar 38 closest to front wall 44 is positioned within collapse clearance feature 66 and closer to front wall 44 than peripheral edge 64 of first sidewall 46.

As described herein, each of left and right mounts 20, 22 are optimized such that they are rigid enough to carry air bag module 28 and support it during its operation. However, each of right and left mounts 20, 22 are also flexible enough to substantially deform during an impact event wherein a driver's knees biases a deployed air bag against each of left and right mounts 20, 22. The aforementioned deformation of left and right mounts 20, 22 advantageously allows for a significant amount of energy dissipation which has been found to substantially reduce or eliminate the risk of a driver's knees impacting either of left or right mounts 20, 22.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air bag mount for a knee air bag system of a heavy truck vehicle, the air bag mount comprising:
   a front wall having an air bag aperture therein adapted for passage of an air bag module of the knee air bag system;
   a first sidewall extending away from the front wall;
   a second sidewall extending away from the from the front wall in opposed spaced relation to the first sidewall;
   a top wall extending away from the front wall;
   a bottom wall extending away from the front wall;
   a bracket structure disposed within an interior space of the air bag mount and configured to provide a connection point for the air bag module; and
   wherein each of the first and second sidewalls and top and bottom walls are free from direct connection to one another.

2. The air bag mount of claim 1, wherein front wall, first and second sidewalls and top and bottom walls define a body structure of the air bag mount, the body structure formed as a unitary body from a sheet metal.

3. The air bag mount of claim 2, wherein the body structure has a constant thickness of about 0.01 inches to about 0.1 inches.

4. The air bag mount of claim 1, wherein each of the front wall, top wall, and bottom wall include a plurality of mounting points for mounting the air bag mount.

5. The air bag mount of claim 4, wherein the top wall has a stepped shape with an upper portion, a lower portion, and an intermediary portion positioned between the upper and lower portions.

6. The air bag mount of claim 5, wherein the plurality of mounting points of the top wall comprises a plurality of apertures formed through the lower portion of the top wall.

7. The air bag mount of claim 4, wherein the bottom wall extends away from the front wall at an angle of greater than ninety degrees to a peripheral edge, and wherein the plurality of mounting points of the bottom wall comprises a plurality of apertures formed proximate the peripheral edge of the bottom wall.

8. The air bag mount of claim 4, wherein the plurality of mounting points of the front wall comprises a plurality of mounting apertures positioned above the air bag aperture.

9. An air bag mount for a knee air bag system of a heavy truck vehicle, the air bag mount comprising:
   a front wall;
   a first sidewall extending away from the front wall;
   a second sidewall extending away from the front wall in opposed spaced relation to the first sidewall;
   a top wall extending away from the front wall to a rear-most peripheral edge;
   a bottom wall extending away from the front wall in opposed spaced relation to the top wall;
   a bracket structure disposed within an interior space of the air bag mount; and
   wherein the air bag mount has a first un-deformed configuration, and a second deformed configuration wherein in the un-deformed configuration the rear-most peripheral edge of the top wall is at a first distance relative to the front wall, and wherein in the deformed configuration the rear-most peripheral edge is at a second distance relative to the front wall less than the first distance.

10. The air bag mount of claim 9, wherein the bottom wall is only connected to the first and second sidewalls via the front wall such that the bottom wall is movable relative to each of the first and second sidewalls and the front wall.

11. The air bag mount of claim 10, wherein the bottom wall forms a first angle with the front wall in the un-deformed configuration, and a second angle with the front wall in the deformed configuration that is greater than the first angle.

12. The air bag mount of claim 9, wherein the first sidewall includes a collapse clearance feature configured to permit movement of an edge of a mounting structure to which the air bag mount is mounted to beyond a rear-most peripheral edge of the first sidewall, wherein the rear-most peripheral edge of the first sidewall is positioned at a third distance from the front wall in the deformed configuration, and wherein the edge of the mounting structure is positioned at a fourth distance from the front wall in the deformed configuration, the fourth distance less than the third distance.

13. The air bag mount of claim 12, wherein the collapse clearance feature is a rectangular cut-out of an upper corner of the first sidewall.

14. The air bag mount of claim 13, wherein the second sidewall extends to a rear-most peripheral edge that is positioned at a fifth distance relative to the front wall in the deformed configuration, the fifth distance less than the third distance.

15. A knee air bag mounting system for a driver side cab space of a heavy vehicle, the cab space including a body structure, a dash assembly mounted to the body structure, and a steering column, the knee air bag mounting system comprising:
   a left mount configured to receive an air bag module;
   a right mount configured to receive an air bag module;
   wherein the left and right mounts are arranged such that the steering column is interposed therebetween;
   wherein each of the left and right mounts are mounted at two distinct locations to the body structure, and at one location to the dash assembly;
   wherein each of the left and right mounts includes a body structure that defines an interior space, and wherein each of the left and right mounts includes a bracket structure contained within the interior space, the bracket structure configured for connection to the respective air bag module received by each of the left and right mounts; and
   wherein the body structure includes a front wall, first and second sidewalls in opposed spaced relation which extend away from the front wall, and top and bottom walls in opposed spaced relation which extend away from the front wall, wherein none of the first and second sidewalls and top and bottom walls are directly connected to one another.

* * * * *